US009063800B2

(12) United States Patent
McCready

(10) Patent No.: US 9,063,800 B2
(45) Date of Patent: Jun. 23, 2015

(54) AUTOMATED METHOD FOR DECOUPLING AVIONICS APPLICATION SOFTWARE IN AN IMA SYSTEM

(75) Inventor: Arthur Kirk McCready, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 1217 days.

(21) Appl. No.: 12/788,032

(22) Filed: May 26, 2010

(65) Prior Publication Data

US 2011/0296379 A1 Dec. 1, 2011

(51) Int. Cl.
*G06F 9/44* (2006.01)
*G06F 9/54* (2006.01)
*G06F 11/36* (2006.01)

(52) U.S. Cl.
CPC . *G06F 9/541* (2013.01); *G06F 8/30* (2013.01); *G06F 8/20* (2013.01); *G06F 11/3664* (2013.01); *G06F 8/71* (2013.01); *G06F 9/4421* (2013.01)

(58) Field of Classification Search
CPC ............... G06F 8/20; G06F 8/30; G06F 8/71; G06F 9/44505; G06F 11/3664; G06F 11/3688
See application file for complete search history.

(56) References Cited

U.S. PATENT DOCUMENTS 6,332,198 B1 12/2001 Simons et al.
6,572,376 B1 * 6/2003 Saunders ........................ 434/30
6,633,883 B2 10/2003 Koskas
6,694,338 B1 2/2004 Lindsay
6,708,329 B1 * 3/2004 Whitehill et al. ............. 717/135
7,139,975 B2 11/2006 Suzuki et al.
7,146,260 B2 12/2006 Preston et al.
7,340,477 B1 3/2008 Tolbert et al.
7,346,893 B2 * 3/2008 Deimel et al. ................ 717/106
7,499,933 B1 * 3/2009 Simpson ....................... 717/106
7,707,278 B2 * 4/2010 Tafazolli et al. .............. 717/121
8,122,434 B2 * 2/2012 Kostadinov et al. .......... 717/121
8,386,660 B2 * 2/2013 Minot ............................. 710/12
8,898,624 B2 * 11/2014 Bouillet et al. ............... 717/106
2002/0144010 A1 * 10/2002 Younis et al. ................ 709/314
2004/0015957 A1 * 1/2004 Zara et al. ..................... 717/121
2004/0045001 A1 3/2004 Bryant
2005/0155016 A1 * 7/2005 Bender ......................... 717/106
2005/0197750 A1 * 9/2005 MacDougall ..................... 701/3

(Continued)

OTHER PUBLICATIONS

Parkinson et al., "Safety-Critical Software Development for Integrated Modular Avionics", Nov. 2007, White Paper, Wind River, pp. 1-10; <http://www.vxworks.ru/safety-critical-sw-dev_wp-1107.pdf>.*

(Continued)

*Primary Examiner* — Thuy Dao
*Assistant Examiner* — Ben C Wang
(74) *Attorney, Agent, or Firm* — Fogg & Powers LLC

(57) ABSTRACT

A method to decouple software in an integrated modular system that employs message-based data exchange is provided. The method includes generating at least one configuration table for use by core software in at least one module in the integrated modular system. The at least one module hosts at least one of a consuming application. The method also includes gathering parameter data from producer messages at the core software in the at least one module based on the generated configuration table, and creating target messages at the core software based on the gathered parameter data. The target messages have a format specific to the consuming application.

19 Claims, 4 Drawing Sheets tooling software generates configuration table for use by core software in at least one module in an integrated modular system — 402
↓
the configuration table is loaded into the associated module — 404
↓
the producing application creates a producer message and transmits to the consuming module — 406
↓
the core software gathers parameter data from producer messages in the module into the consumer specified data structure based on the generated configuration table — 408
↓
core software creates target messages containing the consumer specified data structure — 410

(56) References Cited

U.S. PATENT DOCUMENTS

| | | | | |
|---|---|---|---|---|
| 2005/0216524 | A1 | 9/2005 | Gomes et al. | |
| 2006/0041776 | A1* | 2/2006 | Agrawal et al. | 714/2 |
| 2006/0080451 | A1* | 4/2006 | Eckert | 709/230 |
| 2006/0101474 | A1 | 5/2006 | Magown | |
| 2007/0130437 | A1* | 6/2007 | Larson et al. | 711/165 |
| 2008/0098355 | A1* | 4/2008 | Janiesch et al. | 717/121 |
| 2008/0155513 | A1* | 6/2008 | Ling et al. | 717/135 |
| 2009/0113037 | A1* | 4/2009 | Pouchak | 709/224 |
| 2010/0292979 | A1* | 11/2010 | Minot | 703/21 |
| 2011/0066763 | A1* | 3/2011 | Minot | 710/12 |
| 2011/0250569 | A1* | 10/2011 | Connor | 434/30 |
| 2013/0332901 | A1* | 12/2013 | Berg et al. | 717/121 |
| 2014/0007051 | A1* | 1/2014 | Ritter et al. | 717/121 |
| 2014/0359564 | A1* | 12/2014 | Francois et al. | 717/106 |
| 2014/0372980 | A1* | 12/2014 | Verma et al. | 717/121 |
| 2014/0372981 | A1* | 12/2014 | Said et al. | 717/121 |

OTHER PUBLICATIONS

Manolios et al., "Automating Component-Based System Assembly", 2007, ACM, ISSTA'07, Jul. 9-12, 2007, London, England, United Kingdom, ACM 978-1-59593-734-6/07/0007, pp. 61-71; <http://dl.acm.org/citation.cfm?doid=1273463.1273473>.*

Condor Engineering, Inc., "AFDX Protocol Tutorial", May 2005 Condor Engineering, Inc., pp. 1-47; <http://www.cems.uwe.ac.uk/~ngunton/afdx__detailed.pdf>.*

Ferguson et al. "System Software Framework for System of Systems Avionics", 2005 IEEE, 24th Digital Avionics Systems Conference, Oct. 30, 2005, pp. 8.A.1-1-8.A.1-10; <http://ieeexplore.ieee.org/stamp/stamp.jsp?tp=&arnumber=1563458>.*

Choi et al., "Configuration Tool for ARINC 653 Operating Systems", 2014 SERSC, International Journal of Multimedia and Ubiquitous Engineering, vol. 9, No. 4(2014), pp. 73-84; <http://www.sersc.org/journals/IJMUE/vol9__no4__2014/8.pdf>.*

Horváth et al., "Model-Driven Development of ARINC 653 Configuration", 2010 IEEE, DASC, 2010, Oct. 3-7, 2010, pp. 5.A.5-1-5.A.5-15; <http://ieeexplore.ieee.org/stamp/stamp.jsp?tp=&arnumber=5655322>.*

Ha et al., "Design and Implementation of Software Configuration Tool for Integrated Modular Avionics", 2014 Trans Tech Publications, Switzerland, Sep. 30, 2014, vols. 651-653 (2014), pp. 1827-1830; <http://www.academia.edu/9716196/Design .. Software Configuration Tool for Integrated__Modular__Avionics>.*

Manolios et al., "Automating Component-Based System Assembly", 2007 ACM, ISSTA'07, Jul. 9-12, 2007, pp. 61-71; <http://dl.acm.org/results.cfm?h=1&cfid=646836014&cftoken=84377714>.*

* cited by examiner

AUTOMATED METHOD FOR DECOUPLING AVIONICS APPLICATION SOFTWARE IN AN IMA SYSTEM

BACKGROUND

Application messages sent according to standardized application programming interfaces (API), such as Aeronautical Radio, Inc. (ARINC) 653 standards, are typically either a stream of bytes sent through queuing ports or a fixed set of parameters in a static arrangement sent through sampling ports. The application messages are sent between applications in different partitions through communications ports. A source application assembles multiple parameter values into a message structure and then outputs the message to a port. Then the platform software and hardware move the message, perhaps through an aircraft network, to one or more destination ports, from which destination applications read the message. Each destination application is programmed to extract data parameters it needs from specific positions within specific messages.

The system must adjust as the application developers change the applications. For example, when the producer of an application changes the location of a parameter in the message format, all applications that read that parameter must be changed. Also, if a parameter is moved to a different message, which is common when sensor signals are moved to a different I/O module, all the consuming software must change to consume the parameter from the different message.

Each change requires a rebuild of the application, and a re-test of both the application and the modules that include the application. Thus, as the software implemented by a system evolves, it is necessary to coordinate changes in message content and message format between all software development organizations as part of the software release planning Currently available systems commonly have 50,000-100,000 parameters that are sent in 2000-4000 application messages, so the task is extremely difficult and prone to errors, often leading to project delays and expensive rework.

SUMMARY

The present application relates to a method to decouple software in an integrated modular system that employs message-based data exchange. The method includes generating at least one configuration table for use by core software in at least one module in the integrated modular system. The at least one module hosts at least one of a consuming application. The method also includes gathering parameter data from producer messages at the core software in the at least one module based on the generated configuration table, and creating target messages at the core software based on the gathered parameter data. The target messages have a format specific to the consuming application.

DRAWINGS

In accordance with common practice, the various described features are not drawn to scale but are drawn to emphasize features relevant to the present invention. Like reference characters denote like elements throughout figures and text.

DETAILED DESCRIPTION

Figure 1:
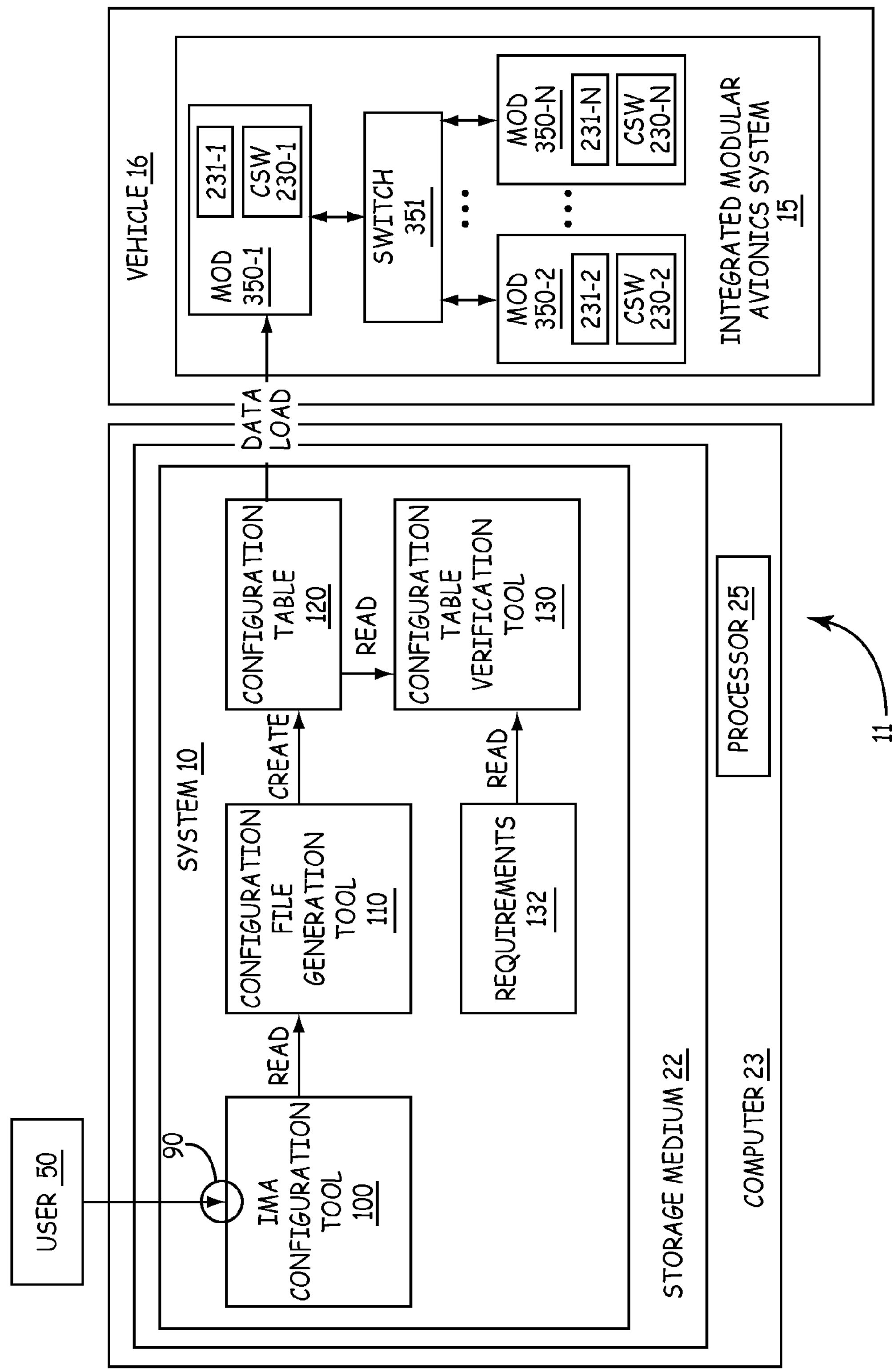
FIG. 1 shows an embodiment of a work flow for a system to decouple software in an integrated modular system that employs message-based data exchange in accordance with the present invention.

In an integrated modular system that employs message-based data exchange, such as an integrated avionics system, many different software applications are allocated to the various units and modules to provide the capabilities of the various system functions (e.g., avionics and utility functions). These applications input data from other applications or from external sensors or data sources, perform computations, and output data to other applications, display devices, or to external effectors, actuators, or communications devices.

An application is software and/or application-specific hardware with a defined set of interfaces that, when integrated with a platform(s), performs a function. The messages described herein are application messages sent between applications and not necessarily the network messages sent over a communication system. The messages described herein contain static arrangements of parameters (sampled data), not data streams. Network messages, unlike application messages, include information in the header and the footer and may contain fragments of an application message. An application message includes a group of parameter values. Typically in ARINC-653-based systems, application messages are either a stream of bytes sent through queuing ports or values for a fixed set of parameters in a static arrangement that are sent through sampling ports. However, queued messaging may be used for static arrangements, especially if the arrangement is large. In environments not based on ARINC 653 standards, the port entity may not specifically exist, but comparable means of sending and receiving streams or static structures may be available.

Application messages may be exchanged between applications in the same execution environment or may be produced by an application in one execution environment and then transmitted to one or more consuming applications in different execution environments through some aircraft system bus or network (e.g., ARINC 664 Part 7 Avionics Full DupleX (AFDX), Military Standard (MIL-STD) 1553B, Avionics Standard Communications Bus (ASCB), and Time-Triggered Gigabit Ethernet (TT-GbE). In one implementation of this embodiment, a message conforms to the definition of "application messages" used in the ARINC 664 Part 7 and ARINC 653 Part 2 industry standards. If ARINC 653 Part 2 industry standards are being implemented, the at least one consuming application is implemented as a partition. If a standard other than the ARINC 653 Part 2 industry standard is being implemented, the partitions are applications. Thus, as defined herein, a "consuming application" is a "consuming partition," when the module in which the consuming application is deployed is based on the ARINC 653 industry standards.

Applications sending data are producer applications or producing applications. A source message is an application message produced by a producing application. Source group messages (also referred to herein as "producer messages") are generated by a source (producer) which specifies a source group structure. The source group structure specifies a composition of the message generated by the producer application.

Applications receiving data are consumer applications or consuming applications. A target message is an application message consumed at a consuming application. Traditionally, the content and format of a target message exactly matched its corresponding source message, and this functionality is still available. However, as described herein, target messages of the desired format are created at core software in the module based on the information indicative of the structure of one or more producer messages (e.g., a source group structures). The consume group is a grouping of selected parameter values extracted from the source messages and moved into the consume group in the target message. The target messages are available in the destination sampling ports on the consuming partitions. Then the consuming application reads the target message from the sampling port using standard ARINC 653 calls or comparable calls in a non-ARINC 653 environment.

A platform is a module or group of modules, including core software, that manages resources in a manner sufficient to support at least one application. A partition is a way of packaging an application that is specific to ARINC 653 compatible operating systems. The partition is an allocation of resources whose properties are guaranteed and protected by the platform from adverse interaction or influences from outside the partition. This feature provides a way to insure that applications in different partitions do not affect each other in unexpected or non-deterministic ways. Other operating systems, for example "Deos", provide time and space partitioning without a specific partition entity. Core software includes the operating system and the support software to manage platform resources in order to provide an environment in which an application can execute, i.e., an execution environment. An execution environment represents the domain of a single instance of an operating system, and may span one or more processors or processor cores.

Functions, as defined herein, represent the application and include software, hardware and/or firmware used by the product developers and software developers. To implement the functions requires one or more applications. A vehicle, such as an aircraft, spacecraft, water-borne vehicle, or an automotive vehicle, often has multiple instances of the same function. So for example, a braking system includes an instance of the function for the brake on each wheel of an automobile, (e.g., a front-left braking function, a front-right breaking function, a rear-left braking function, a rear-right breaking function) since each function is running a different brake. The instances are identical, but have different sets of inputs and outputs. For another example, there are separate instances of software, which are run on the same computer, for the separate displays used by a pilot, a copilot, and a navigator on an aircraft.

As defined herein, an aircraft network includes the integrated modular avionics (IMA) system and other devices communicatively coupled to the IMA system as required for functioning of the aircraft communications and/or aircraft software/hardware. In one implementation of this embodiment, vehicle is not an aircraft and the IMA system is an integrated modular system.

The coupling of the consuming applications to the producing applications and/or to the system network (e.g., aircraft network) used to transport a message through the system network is a critical aspect of system integration. The coupling occurs when the consuming application is dependent on: 1) the particular structure of the message produced by formatting or by the source application; or 2) timing characteristics of the system network.

It is typically the responsibility of a system integrator to manage the interfaces between the producing applications and consuming applications to insure that they are consistent. The system integrator is also responsible for managing the allocation of applications to execution environments in the modules of the integrated modular system, managing the interface from each module to the rest of aircraft network, and configuring the integrated modular system to ensure that each application in the integrated modular system receives the messages it requires within a specified time interval. Systems integration is becoming more difficult as the number and complexity of functions and applications to be integrated increases, and is a common cause of cost overruns and schedule delays in integrated systems.

ARINC 653 is becoming increasingly popular as an execution environment to host safety critical applications because 1) it provides both space and time partitioning of multiple applications running in a single execution environment, and 2) it is an industry standard allowing skills, tools, and to some degree software, to be used on multiple programs. With ARINC 653, messages are sent between applications in different partitions through communications ports. A source application assembles data values into a message structure and then outputs the message to a port. Then the platform software and hardware move the message to one or more destination applications, which read the message from a port. In an IMA system with multiple modules connected by a communications network, source ports are communicatively coupled to destination ports in the receiving modules. In an ARINC-653-based system, each destination application is programmed to extract the data parameters it needs from specific positions within specific messages.

The system and methods described herein are used to decouple the consuming applications from the producing applications and/or to the system network. When the consuming applications are decoupled from the producing applications, the system integrator does not need to rebuild or re-test consuming applications when one of the producing applications is changed by an application developer. The systems and methods described herein provide decoupling between the communication port and the network interface (e.g., a port in the execution environment) on the consuming side while using an application programming interface (API), such as that specified in ARINC 653, in which the user reads an entire message rather than just plucking out individual parameters from the message.

FIG. 1 shows an embodiment of a work flow for a system 11 to decouple software in an integrated modular system 15 that employs message-based data exchange in accordance with the present invention. The description of the integrated modular system 15 provided herein is focused on an integrated modular avionics (IMA) system 15, but other types of system can be envisioned. System 11 isolates consumer applications from producer applications to avoid rebuilding when changes in application interface specifications occur. Two typical types of changes to applications include changes that alter which application produces the data of interest and changes in the position of the data item of interest within the data structure produced by the producer applications.

The integrated modular system 15 in a vehicle 16 includes modules 350(1-N) that are communicatively coupled to each other. In one implementation of this embodiment, the modules are communicatively coupled by one or more switches 351 in a switched network such as AFDX (ARINC 664 Part 7) or Time-Triggered Ethernet. In another implementation of this embodiment, the modules are part of a switchless network having a bus, ring, mesh, or point-to-point topology. The modules 350(1-N) use operating systems or environments that employ message-based rather than parameter-based data exchange. In one implementation of this embodiment, the modules 350(1-N) use ARINC 653 operating systems. The modules 350(1-N) are decoupled by the core software/firmware 230(1-N) (also referred to herein as "core software 230(1-N)" and "core software function 230(1-N)") that is loaded into the decoupled modules 350(1-N) from system 10. System 10 is in a storage medium 22 in a non-transitory computer 23 (also referred to herein as a tooling computer 23).

The software systems in system 11 include the software systems in system 10 and the core software function (CSW) 230 in each decoupled module 350(1-N). The software systems in system 10 include: an integrated module avionics (IMA) Configuration Tool 100, a configuration file generation tool 110, and a configuration table verification tool 130, which are software tooling components used during design; and a configuration table 120 generated by configuration file generation tool 110. The generated configuration table 120 is loaded into at least one of the modules 350(1-N) and is used by the respective at least one core software 230(1-N). The core software 230(1-N) perform the gathering and grouping operations of a consume group (e.g., the grouping of selected parameter values within the consume group message). The software in system 10 is executable by the processor 25. The core software function 230 in each decoupled module 350(1-N) is executable by an associated processor 231(1-N). In one implementation of this embodiment, the modules are part of a computer (not shown in the vehicle 16). In another implementation of this embodiment, the core software function 230 in each decoupled module 350(1-N) is executable by a processor 231 in a computer (not shown) in the vehicle 16 that is communicatively coupled to the modules 350(1-N).

The software tooling components are also referred to herein as a first software design tool (such as the IMA configuration tool 100), second software design tool 110 (such as configuration file generating tool 110), and a third software tool 130 (such as configuration table verification tool 130) to build at least one configuration table 120. The first software design tool 100 provides a user interface 90 to a user 50. The user 50 is enabled to specify, based on the user interface: 1) a composition and a format of a message produced by at least one producing application in at least one module in an integrated modular system; and 2) a composition and a format of consume groups for a consuming application.

The second software design tool 110 reads source group specifications and the consumer-group specifications and generates the configuration table 120 for at least one execution environment 210-*m*, where 210-*m* is indicative of a $m^{th}$ one of the execution environments 210(1-2), in at least one module 350-*i*. The third software tool 130 validates the generated configuration table 120. The validated configuration table is loaded into the at least one module 350-*i*.

As shown in FIG. 1, the software in the module 350-1 of the integrated modular system 15 is being decoupled from changes in the application interface specifications by a download of the configuration table 120. When the download of the configuration table 120 to the module 350-1 is completed, the module 350-1 is insulated from (decoupled from) a change that alters which producing application provides data of interest for the consuming applications in the integrated modular system 15. Likewise, the module 350-1 is insulated from (decoupled from) a change in position of the data item of interest within the data structure produced by the producing application. This process can occur for the N modules 350(1-N). A module 350-*j*, where 350-*j* is indicative of a $j^{th}$ one of the modules 350(1-N), can be communicatively coupled to system 10, when that module is receiving new and/upgraded software. The configuration table 120 loaded into the module 350-*j* can be different from the configuration table 120 loaded into another one of the N modules 350(1-N).

System 10 is described for an aircraft or spacecraft with avionics. It is to be understood that system 10 can be implemented on other vehicles, such as automotive vehicles, waterborne vehicles, or trains. In these latter embodiments, the standards are those developed for the appropriate vehicle. If the vehicle 15 is not an aircraft, the integrated module avionics (IMA) Configuration Tool 100 is an integrated module Configuration Tool 100 and the IMA system 15 is an integrated module system 15.

The integrated module avionics (IMA) Configuration Tool 100 specifies the data interface (i.e., input and output application messages, including messages data structures and the rates at which the target messages and the produced messages are consumed and produced, respectively) of every application/partition in the IMA system 15, and specifies the allocation of applications/partitions to execution environments and modules. The IMA Configuration Tool 100 provides a user interface represented generally at 90 with which an application developer 50 (user 50) can specify the composition and format of the consume groups the consuming application is to consume. The user interface 90 (FIG. 1) is configured to receive a composition of at least one consume group and the format of the at least one consume group. The IMA configuration tool 100 of system 10 permits application developers to define groups of parameters that their application wants to read or consume, and to define the exact structure of the data groups. The groups of parameters and the exact structure of the data groups are defined herein as a "consume group." The consume group is provided within a consume group message.

The configuration file generation tool 110 reads the consume group structures and group parameters and generates a configuration table 120 for each module 350(1-N) or execution environment 210(1-2) that can be loaded into the modules 350(1-N) and subsequently to the core software 230(1-N) on the respective module 350(1-N), which performs the gathering and grouping operations of the module 350. The configuration file generation tool 110 of system 10 gathers data into the groups at run time to form new messages to be sent to the receiving application's communication ports, so that the consuming application can read the group data using a message reading API like the standard ARINC 653 API routines.

The configuration table verification tool 130 is qualified to validate the configuration table 120 in order to ensure the configuration table 120 is correct and complete. In one implementation of this embodiment, the configuration table verification tool 130 is qualified per DO-178B.

Application software and certification is simplified since consuming applications require no modification if the producer message structure changes or if parameters move to entirely different messages. Applications no longer need to read many different messages and extract the pertinent data from them. The infrastructure provided by system 11 performs this function. The software and hardware can be tested for credit once, and then reused on multiple modules in multiple vehicles. The functionality is specified by data tables which can be validated in minutes using automated techniques. Thus, module and system integration labor is significantly reduced.

Figure 2:
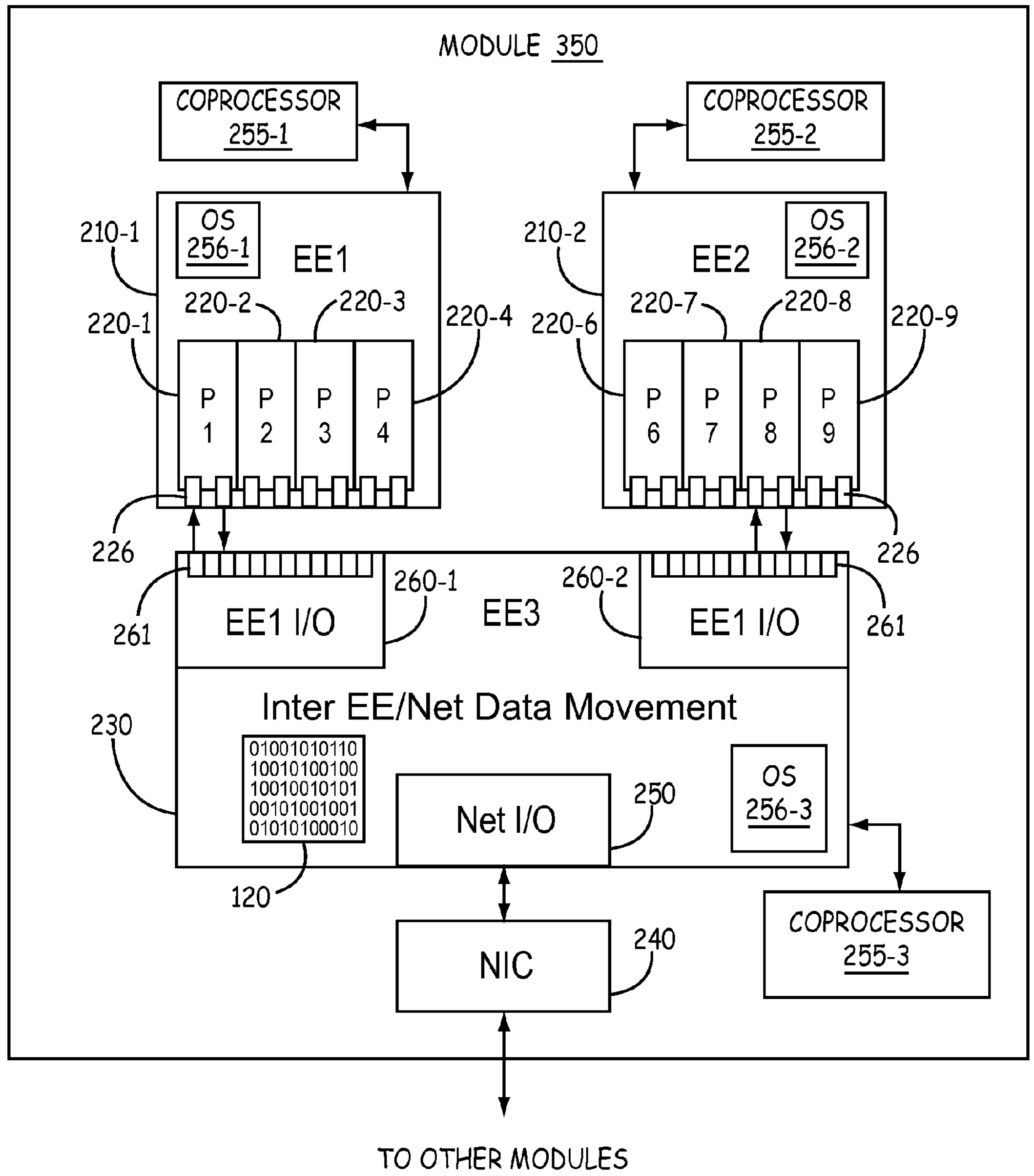
FIG. 2 shows an embodiment of a module in an integrated modular system that employs message-based data exchange in accordance with the present invention.

FIG. 2 shows an embodiment of a module 350 in an integrated modular system 15 (FIG. 1) that employs message-based data exchange in accordance with the present invention. Module 350 provides an example of a module that includes multiple execution environments and is representative of any of the modules 350(1-N) in system 10 (FIG. 1). Each module 350(1-N) implements a configuration table 120 appropriate for that module. Each module 350 can implement a different configuration table 120 that is stored in the core software 230. The core software 230 is also an execution environment (EE3) 230. Thus, in embodiments, the modules 350(1-N) implement configuration tables 120 (only one of which is shown) at least one of which differs from the others.

The module 350 includes at least one execution environment 210(1-2) and 230, communications coprocessors 255 (1-3), and network interface hardware (NIC) 240. In the exemplary module 350 shown in FIG. 2, there are three execution environments 210(1-2) and 230 each including a respective operating system (OS) 256(1-3) and communicatively coupled to a respective one of the communications coprocessors 255(1-3). The execution environments 210(1-2) include partitions 220. The partitions 220 include I/O sampling and queuing ports 226. The exemplary module 350 shown in FIG. 2 is based on the ARINC 653 industry standards and illustrates partitions 220(1-9) by the labels P1, P2 . . . P9 in the execution environments 210(1-2). If the module shown in FIG. 2 is based on other than the ARINC 653 industry standards, the labels P1, P2 . . . P9 are changed to labels A1, A2 . . . A9, representative of applications 1-9.

The execution environments 210(1-2) run applications and are hence general purpose in nature. In one implementation of this embodiment, execution environments 210(1-2) host a flexible time and space partitioned operating system like Deos or ARINC-653 implementations. The execution environment 230 has a specific purpose of running the core software and of managing the data flow between the execution environments 201(1-2). Hence, execution environment 230 does not need to be time or space partitioned, and has a simple operating system 256-3 to run core software internal to the execution environment 230. In one implementation of this embodiment, the operating system 256-3 is a scheduler and collection of interrupt handlers.

The core software (EE3) 230 includes execution environment input/outputs (EE I/O) 260(1-2), network input/output (I/O) 250, the operating system 256-3, and a stored configuration table 120 that was generated, verified, and loaded from system 10 during a software upgrade and/or installation process. The execution environment input/outputs 260(1-2) are associated with a respective one of the execution environments 210(1-2). The execution environment input/outputs 260(1-2) each include a plurality of communication ports 261 that are communicatively coupled to an associated one of the I/O sampling and queuing ports 226 in the execution environments 210(1-2). The core software 230 performs data movements specified by the configuration table 120 stored in the core software/firmware 230. The core software core software 230(1-N) (FIG. 1) in the at least one module 350-*i* hosts at least one of the consuming application or a partition (e.g., partition 220-*k*, where 220-*k* is indicative of a $k^{th}$ one of the consuming partitions 220 shown in FIG. 1).

The configuration table 120 generated by the second software tool 110 is also included in the software tooling components. The configuration table generated by the second software design tool 110 is loaded into the at least one module 350-*i*. The specific mechanism for data loading is known in the art and may differ from system to system.

The core software 230-i (e.g., the core software in the $i^{th}$ module 350-*i*) is implemented by reading input messages from input sampling ports 226, extracting data parameters and status values from the input messages as specified by the configuration table, placing the data parameters and status values into data structures as specified by the configuration table, and writing said data structures to output sampling ports 226. The operating system 256 copies data to a destination sampling port 226 of the $n^{th}$ consuming application 221-*n*.

In one implementation of this embodiment, the core software 230-*i* performs the gathering and grouping operation as data is moved to the destination sampling port 226 of the partition prior to a scheduled execution of said partition. In this embodiment, a communications coprocessor 255-*i* handles the movement of sampling port messages between network interfaces and execution environments on the module.

Core software 230-*i* can be implemented in several ways. The easiest and least efficient way is to implement the function of the core software 230-*i* in an I/O partition approach. The I/O partition approach is used to: 1) read all the input messages from sampling and queuing ports 226); 2) extract the desired data parameter and status values and place them into data structures as specified by the configuration table 120; and 3) write the structures to sampling and queuing ports 226 so that the operating system 256 copies the data to the destination sampling port of the consuming application. In the I/O partition approach, the core software 230-*i* is implemented as a standard application, which requires scheduling to run at the correct times. Thus, the I/O partition approach uses more memory and processor time than if the consumer just reads the produced messages. But the I/O partition approach advantageously provides the desired decoupling and can work in any ARINC 653 environment. Thus, such an embodiment includes one execution environment with one or more input/outputs (I/O) and the application partitions (e.g., 220-*k*) are communicatively coupled to the network interface 240.

Another way to implement the function of the core software 230-*i* is to augment the standard communication port drivers (not shown) as part of the operating system instead of being a partition of the execution environment 210-*m* to perform the gathering and grouping operation as the operating system 256-*i* moves data to the destination sampling port 226 prior to the scheduled execution of the partition 220-*k*. This implementation requires somewhat less memory and processor time than the I/O partition approach. This implementation increases the time required between partition executions but is simpler for the module integrator. This augmentation of the standard communication port drivers as part of the operating system requires modification of operating system components and the associated certification, but these are components that often require modification for each platform.

The operations are inherently synchronized with these two implementations. In all cases the core software 230-*i* does not change based on the data movement specifications. In these implementations, binary reuse is possible if the operating system 256 supports it.

A third implementation of the core software function 230-*i*, as is shown in FIG. 2, permits gathering and grouping operations using the communications coprocessor 255(1-3) that also handles that movement of sampling port messages between network interfaces 240 and execution environments 210(1-2) on the module 350-*i*. This approach is advantageous because no additional processing resources or memory are required in the execution environment 210-*m* and it does not depend on which operating system 256 runs in the execution environment 210-*m*. It isolates the execution environment 210-*m* from message changes, because execution timing in the execution environment 210-*m* is not affected when parameter changes are made. It also supports multiple execution environments 210(1-2) on the module 350, potentially with different operating systems 256(1-3) in the various execution environments 210(1-2) and 230. This approach requires the module design to include a sufficiently powerful communications co-processor 255-3. This approach also requires additional computations in the software tooling 100, 110, and 130 to precisely schedule when to perform each gathering and grouping operation so that the data gets moved to the communication port storage of the execution environment 210-*m* before the consuming partition 220-*k* is scheduled to run.

The processors 25 (FIG. 1), processors 231(1-N) and co-processors 255(1-3) (FIG. 1) execute software and/or firmware that causes the processors 25 and 231(1-N) and co-processors 255(1-3) to perform at least some of the processing described herein as being performed by the tooling computer 23 and the integrated modular system 15. In one implementation, the processors 25 and 231(1-N) include microprocessors and/or microcontrollers. Moreover, the processors 25, processors 231(1-N), and co-processors 255(1-3) can be implemented with a memory (not shown), which is a separate element or which is integrated with one of the processors 25, processors 231(1-N), and co-processors 255(1-3) for implementation as a single device (for example, a single integrated-circuit device). The memories can include any suitable memory now known or later developed such as, for example, random access memory (RAM), read only memory (ROM), and/or registers within the processors 25 and 231(1-N). In one implementation, one or more of the processors 25 and 231(1-N) and co-processors 255(1-3) include processor support chips and/or system support chips such as application-specific integrated circuits (ASICs).

Figure 3:
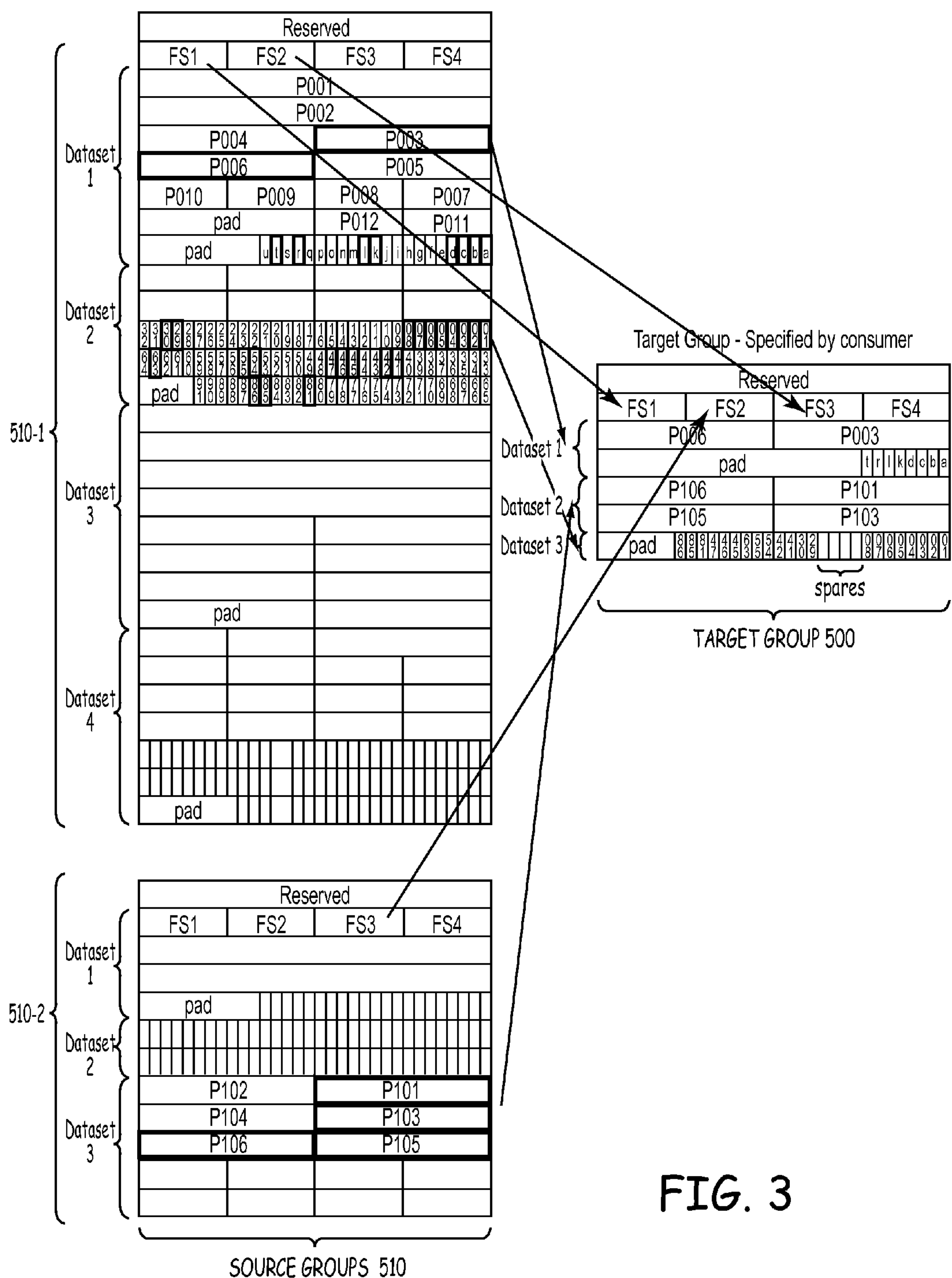
FIG. 3 shows an embodiment of a consume group gathering parameter values from a source group for a consumer specified target group in accordance with the present invention.

FIG. 3 shows an embodiment of a consume group gathering parameter values from a source group 510 for a consumer specified target group 500 in accordance with the present invention. The primary objective of the consume group mechanism is to decouple the consuming software from changes made in parameter positioning in the producers' data structures, or from changes that alter which application message (parameter group) contains a particular parameter. A common example of the latter situation occurs when an external input signal is moved from one I/O module to another. A related secondary objective is to allow the consuming software to organize the data parameters into a structure that is small and convenient. This can reduce the memory and execution time required for the consuming software. The final objective is to accomplish these capabilities without requiring the applications to use proprietary APIs. If the applications are on an ARINC 653 platform, they use standard inter-partition APIs provided by the operating system 256.

While it is possible to implement this scheme using an I/O partition, doing so does not allow you to reap the benefits of reduced CPU and memory. It is preferable to implement the functionality with platform hardware and middleware, including software running in soft cores (or hard cores) embedded in field-programmable gate arrays (FPGAs) or ASICs. The intention is to offload the application level processor(s). The middleware is not application specific. Rather, it is generic and table-driven, so that one set of software is useful for many different modules, with configuration tables specifying the processing to be performed for each distinct module instance.

Each consume group is configured to identify the rules and constraints to which it must adhere. For example, a group may be required to adhere to certain formatting conventions or standards such as for ARINC 664 Part 7 sampling ports, ARINC 653 Part 2 sampling ports, or an aircraft manufacturer's interoperability specification.

Data to drive movements for the source group specification include but are not limited to: port or source structure address; dataset number or FSB offset; parameter identifier; data type (may not need); parameter offset; parameter size; and/or count (for arrays).

Data to drive movements for the target group specification include but are not limited to: port or target structure address, dataset number or FSB offset, parameter identifier, data type, parameter offset, parameter size, and count (for arrays).

In the exemplary gathering of parameter values from a source group 510 for a consumer specified target group 500 that is shown in FIG. 3, dataset 1 in the target group 500 includes two short integers and eight discretes from source group 510-1, dataset 1 of the source group 510. As defined herein, a short integer includes two bytes and a discrete is a single bit. Dataset 2 in the target group 500 includes four short integers from source group 510-2, dataset 3 of the source group 510. Dataset 3 in the target group 500 includes twenty-one discretes from source group 510-1, dataset 2 of the source group 510. As shown in the dataset 3 of the target group 500, the order of the discretes is changed from the order in the source group 510-1.

The system embodiments described herein are implemented using a produce/consume model. It is to be understood, that the systems can be implemented using a publish/subscribe model, as is understandable one to one skilled in the art.

Figure 4:
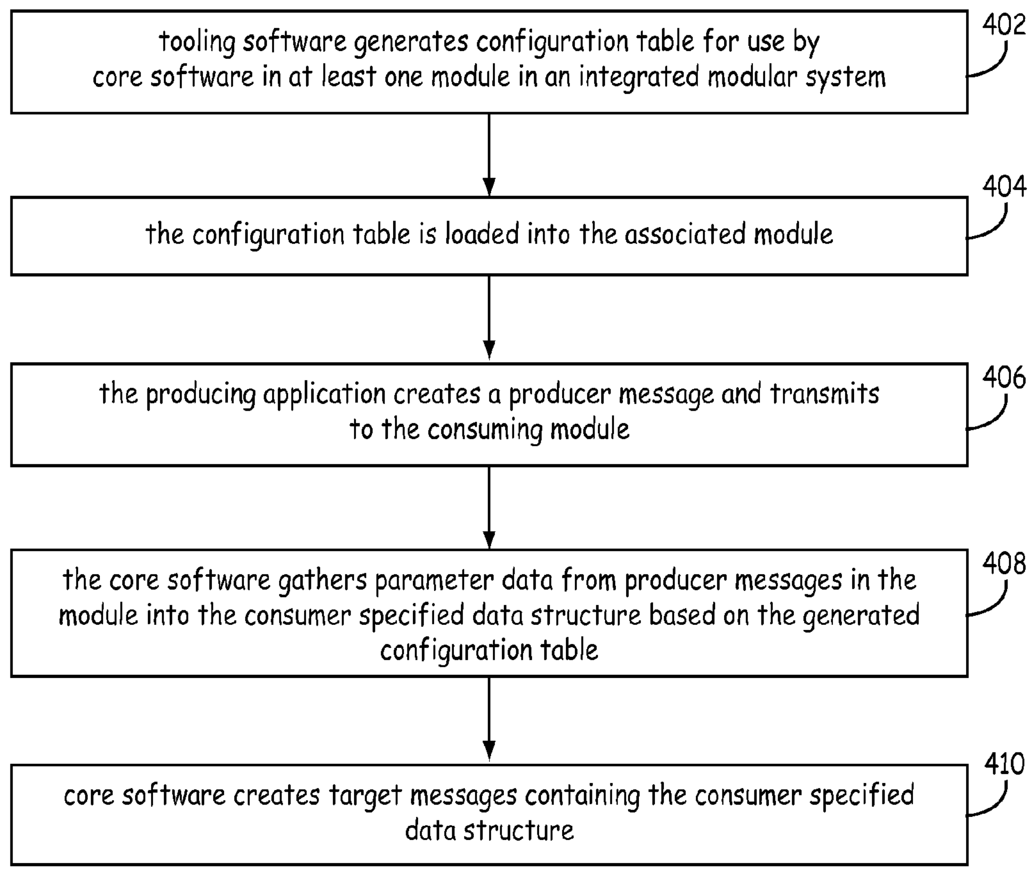
FIG. 4 is a flow diagram of one embodiment of a method to decouple software in an integrated modular system that employs message-based data exchange in accordance with the present invention.

FIG. 4 is a flow diagram of one embodiment of a method 400 to decouple software in an integrated modular system 15 that employs message-based data exchange in accordance with the present invention. The method 400 is implemented by a program product for decoupling software in the integrated modular system 15 that employs message-based data exchange. The program-product includes a processor-readable medium on which program instructions are embodied.

At block 402, the tooling software 100, 110, and 130 in the system 10 generates at least one configuration table 120 for use by core software 230 on at least one module 350-*i* in the integrated modular system 15. A portion of the program instructions are executed by at least one processor 25 included in the non-transitory tooling computer 23 to cause the tooling computer 23 to generate at least one configuration table 120 for use by core software 230-*i* in at least one module 350-*i* in the integrated modular system 15.

The module 350-*i* hosts at least one of a consuming application. If the module 350-*i* includes an execution environment that is based on ARINC 653 standards, the consuming application is partitioned, as shown in FIG. 2, into partitions 220-*k*. Typically, there is a one to one correspondence between application instances and partitions. If an execution environment is not based on ARINC 653 there is no partition; there is only the application, but the resulting functionality is the same. In one implementation of this embodiment, the at least one module 350-*i* hosts at least one consuming application and at least one partition 220(1-4). In another implementation of this embodiment, the consuming application is in one of the modules 350(2-N) within the integrated modular system 15 that is communicatively coupled to the module 350-1. In yet another implementation of this embodiment, the consuming application is in a module (not shown) external to the integrated modular system 15.

The integrated module avionics (IMA) configuration tool 100 receives information indicative of a composition and a format of consume groups that the at least one application is to consume from an application developer (shown as user 50 in FIG. 1). The integrated module avionics (IMA) configuration tool 100 also receives information indicative of a composition and a format of produced groups containing the parameters the at least one application is to consume. In order to create the consume group, the format of the source groups from which the parameters are to be extracted must be known. The IMA configuration tool 100 generates at least one consume group for the at least one consuming application based on the received information. The at least one consume group specifies the following: data parameters and associated functional status parameters for the at least one consuming application; a grouping of said data parameters for messages to be consumed; at least one of a format and a structure of the messages to be consumed; and a read rate of the messages to be consumed. The IMA configuration tool 100 specifies a data interface for the at least one consuming application and the at least one partition in the integrated modular system. The associated functional status parameters are required to indicate whether the parameter values are valid or not. The functional status parameter values are the elements labeled as FS-n (for the $n^{th}$ FS) in the group structures shown in FIG. 3. The IMA configuration tool 100 specifies the allocation of the at least one consuming application and the at least one partition to execution environments in the at least one module in the integrated modular system. In one implementation of this embodiment, specifying the data interface is specifying the target messages and the produced messages, including message data structures and the rates at which the target messages and the produced messages are consumed and produced, respectively.

The IMA configuration tool 100 reads the structure of said messages in the at least one consume group. The configuration file generation tool 110 generates the configuration file 120 for the execution environments 210-*m* in the at least one module 350-*i*.

Before the generated configuration file 120 is loaded into the core software 230 of a module 250-*i* in the integrated modular system 15, the generated configuration table 120 is validated by the configuration table verification tool 130. The configuration table verification tool 130 reads the requirements 132 to perform the validating. In one implementation of this embodiment, the configuration table verification tool 130 reads requirements that are based on a standard that is associated with the message-based data exchange.

At block 404, the configuration table 120 is loaded into the associated module 350. The rest of the method 400 describes how the generated configuration table is implemented to decouple the core software 230 in the module 350 from any upgrades that may be required at a later time. A portion of the program instructions are executed by at least one processor 231-*i* included in the module 350-*i* in the integrated modular system 15 to cause the integrated modular system 15 to perform the steps of blocks 406 and 408.

At block 406, the producing application creates a producer message and transmits the producer message to the consuming module. At block 408, the core software 230-*i* gathers parameter data from producer messages in the module 350-*i* into the consumer specified data structure based on the generated configuration table 120. The generated configuration table 120 is stored in the core software 230-*i*. In one implementation of this embodiment, the parameter data is gathered from one or more input/output units sampled at more than one data rate.

At block 410, the core software 230-*i* creates target messages based on the consumer specified data structure. The target messages have a format that is specific to the consuming application. In this manner, the format of the target message is specifically designed to meet the needs of the consuming application and only the consuming application. Each consuming application obtains messages specifically designed to meet its needs. The consuming application in programmed to use the data structure of the target group containing the parameters it needs to consume. Any additional changes desired by the producer of an application can be incorporated by generating a new configuration table (as in block 402) and loading it into the associated module (as in block 406).

Although specific embodiments have been illustrated and described herein, it will be appreciated by those skilled in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method executable by a processor to decouple software in an integrated modular system that employs message-based data exchange, the method comprising:

generating, at an integrated module avionics configuration tool and a configuration file generation tool, at least one configuration table for use by core software in at least one module in the integrated modular system, wherein the at least one module hosts at least one consuming application;

loading the generated at least one configuration table into an associated one of the at least one module;

extracting parameter data from selected portions of at least one of a plurality of producer messages, output from at least one of a plurality of producing applications, at the core software in the at least one module, the extraction being based on information contained in the generated at least one configuration table; and creating at least one target message at the core software by organizing and formatting the extracted parameter data in a format specified by the at least one consuming application, wherein the at least one consuming application is decoupled from changes in the at least one of the plurality of producer messages resulting from one or more modifications of one or more producing applications, and wherein if one of the plurality of producing alications is modified, the at least one created target message has different content from the at least one of the plurality of producer messages and has a format specific to the at least one consuming application.

2. The method of claim 1, wherein the at least one module hosts the at least one consuming application, wherein generating the at least one configuration table comprises:

receiving information indicative of a composition and a format of consume groups the at least one application is to consume, receiving information indicative of a composition and a format of produced groups containing the parameters the at least one application is to consume, generating at least one consume group for the at least one consuming application based on the received information, wherein the at least one consume group specifies 1) data parameters and associated functional status parameters for the at least one consuming application, 2) a grouping of said data parameters for messages to be consumed, 3) at least one of a format and a structure of said messages, and 4) a read rate of the messages;

specifying a data interface for the at least one consuming application; and specifying an allocation of the at least one consuming application to execution environments in the at least one module.

3. The method of claim 2, wherein specifying the data interface comprises specifying the target messages and the produced messages, including message data structures and the rates at which the target messages and the produced messages are consumed and produced, respectively.

4. The method of claim 2, wherein generating at least one configuration table further comprises:

reading the structure of said messages in the at least one consume group;

generating a configuration table for the execution environments in the at least one module; and validating the generated at least one configuration table.

5. The method of claim 4, wherein validating the generated at least one configuration table comprises reading requirements based on a standard associated with the message-based data exchange.

6. The method of claim 1, wherein the integrated modular system is executed in an ARINC-653-based system, wherein the at least one consuming application hosted in the at least one module is implemented as a partition, and wherein creating target messages at the core software based on the gathered parameter data includes creating target messages having a format specific to the partition.

7. A program product for decoupling software in an integrated modular system that employs message-based data exchange, the program-product comprising a non-transitory processor-readable medium on which program instructions are embodied, wherein the program instructions are operable, when executed by at least one processor included in a tooling computer to cause the tooling computer to:

generate, at an integrated module avionics configuration tool and a configuration file generation tool, at least one configuration table for use by core software in at least one module in the integrated modular system, wherein the at least one module hosts at least one consuming application; and wherein, when the generated at least one configuration table is loaded into the at least one module in the integrated modular system, the program instructions are operable, when executed by at least one processor included in the integrated modular system, to cause the integrated modular system to:

extract parameter data from selected portions of at least one of a plurality of producer messages, output from at least one of a plurality of producing applications, at the core software in the at least one module based on information contained in the generated at least one configuration table; and create at least one target message at the core software by organizing and formatting the extracted parameter data in a format specified by the at least one consuming application, wherein the at least one consuming application is decoupled from changes in the at least one of the plurality of producer messages resulting from one or more modifications of one or more producing applications, and wherein if one of the plurality of producing applications is modified, the at least one created target message has different content from the at least one of the plurality of producer messages and has a format usable by the at least one consuming application.

8. The program product of claim 7, wherein the at least one module hosts the at least one consuming application, and wherein the program instructions are operable to generate the at least one configuration table comprising program instructions operable to:

receive information indicative of a composition and a format of consume groups the at least one application is to consume from; and generate at least one consume group for the at least one consuming application based on the received information.

9. The program product of claim 8, wherein the program instructions are operable, when executed by the at least one processor included in the tooling computer to further cause the tooling computer to:

specify a data interface for the at least one consuming application; and specify an allocation of the at least one consuming application to execution environments in the at least one module.

10. The program product of claim 9, wherein the program instructions are operable, when executed by the at least one processor included in the tooling computer, to further cause the tooling computer to:

specify input and output application messages, including message data structures.

11. The program product of claim 9, wherein the program instructions operable to generate at least one configuration table when executed by the at least one processor further include program instructions in the tooling computer to further cause the tooling computer to:

read the structure of said messages in the at least one consume group; and generate a configuration table for the execution environments in the at least one module.

12. The program product of claim 7, wherein the program instructions operable to generate at least one configuration table further, when executed by the at least one processor included in the tooling computer to cause the tooling computer to validate the generated at least one configuration table.

13. The program product of claim 12, wherein program instructions operable to validate the generated at least one configuration table comprise program instructions operable to read requirements based on a standard associated with the message-based data exchange.

14. The program product of claim 7, further comprising program instructions operable to load the at least one configuration table into an associated one of the at least one module.

15. A system for decoupling software in an integrated modular system that employs a message-based data exchange, the system comprising:

at least one processor;

software tooling components to build at least one configuration table, wherein the software tooling components are configured to be executed by the at least one processor, the software tooling components including:

a first software design tool providing a user interface to an application developer, wherein the application developer is enabled to specify, based on the user interface: 1) a composition and a format of a message produced by at least one producing application in at least one module in an integrated modular system; and 2) a composition and a format of consume groups for a consuming application, a second software design tool to read source group specifications and consumer-group specifications and to generate the configuration table for at least one execution environment in at the least one module, and third software tool to validate the generated configuration table, wherein the validated configuration table is loaded into the at least one module;

a core software function in the at least one module hosting the at least one consuming application; and the configuration table generated by the second software tool, wherein the configuration table is loaded into the at least one module.

16. The system of claim 15, wherein the core software is implemented by:

reading input messages from input sampling ports;

extracting data parameters and status values from the input messages as specified by the configuration table;

placing the data parameters and status values into data structures as specified by the configuration table; and writing said data structures to output sampling ports, wherein an operating system copies data to a destination sampling port of the consuming application.

17. The system of claim 16, wherein the core software is implemented by performing the gathering and grouping operation as data is moved to the destination sampling port of the consuming application prior to a scheduled execution of said consuming application.

18. The system of claim 16, further comprising:

a communications coprocessor, wherein the communications coprocessor handles a movement of sampling port messages between network interfaces and execution environments on the module.

19. The system of claim 16, wherein the user interface is configured to receive a composition of at least one consume group and the format of the at least one consume group.

* * * * *